United States Patent [19]

Ida et al.

[11] Patent Number: 4,839,759
[45] Date of Patent: Jun. 13, 1989

[54] TAPE BED AND MODE-CHANGING MECHANISM ARRANGEMENT FOR THIN CASSETTE TYPE RECORDER

[75] Inventors: Mitsuru Ida, Tokyo; Noriyuki Koga, Saitama, both of Japan

[73] Assignee: Sony Corporation, Tokyo, Japan

[21] Appl. No.: 205,031

[22] Filed: Jun. 2, 1988

Related U.S. Application Data

[63] Continuation of Ser. No. 896,221, Aug. 8, 1986, abandoned.

[30] Foreign Application Priority Data

Aug. 20, 1985 [JP] Japan .............................. 60-127099[U]

[51] Int. Cl.⁴ .............................................. G11B 15/18
[52] U.S. Cl. .................................... 360/96.3; 360/96.1
[58] Field of Search ............................... 360/96.1–96.6

[56] References Cited

U.S. PATENT DOCUMENTS 4,301,483  11/1981  Santoro ............................. 360/96.3
4,408,237  10/1983  Takahashi et al. ................. 360/96.4

Primary Examiner—Robert S. Tupper
Attorney, Agent, or Firm—Ronald P. Kananen

[57] ABSTRACT

A cassette type recording and/or reproducing apparatus having a chassis in which a cassette is mounted on an upper surface thereof. An upper surface of the chassis is formed with a recess in whcih a pair of reels and a gear machanism including a plurality of gears to actuate the pair of reels to rotate are mounted from an above direction, thus reducing a height dimension of the entire apparatus and achieving an easy assembly operation with fewer parts and less labor time for the assembly of the apparatus.

16 Claims, 5 Drawing Sheets

TAPE BED AND MODE-CHANGING MECHANISM ARRANGEMENT FOR THIN CASSETTE TYPE RECORDER

This application is a continuation of application Ser. No. 06/896,221, filed Aug. 8, 1986, now abandoned.

BACKGROUND OF THE INVENTION

The present invention relates generally to a cassette type recording and/or reproducing apparatus and, more particularly, to a cassette type recording and/or reproducing apparatus having a chassis capable of mounting a cassette on an upper part thereof. More particularly, this invention relates to a thin cassette recording apparatus having a chassis with a recess wherein the tape reels and the mode-changing mechanism are mounted within the recess. Still more particularly, this invention relates to a thin cassette recording apparatus wherein a recessed chassis and the arrangement of parts facilitates easy assembly primarily from a direction above the chassis.

In a conventional cassette type tape recorder, in which a cassette is mounted on an upper part of a chassis to which a pair of left and right reel beds are attached, the reel beds are mounted above a chassis on an upper portion of an upper surface of the chassis. Gears to rotate the reel beds are mounted below the chassis on a lower part of the chassis. Hence, it is difficult to mount the cassette compactly on the upper surface of the chassis. Therefore, it is required to float the cassette with respect to the upper surface of the chassis. Consequently, it is difficult to achieve a thin structure for the cassette type recording and/or reproducing apparatus.

In addition, since the reel beds and gears must be assembled above and below the chassis respectively on the upper and lower portions of the chassis separately, a reduced assembly efficiency results.

The applicants have proposed a thin structure for a cassette type recording and/or reproducing apparatus in U.S. Pat. No. 4,630,149. In the above-identified Patent, a chassis for mounting a cassette thereon is provided with two holes for the two reel beds and the two reel beds are supported on another chassis.

Nevertheless, it has remained a problem to provide a thin cassette-type recording apparatus wherein the parts are conveniently arranged and assembled in a chassis while the cassette remains quite thin and the functions of the apparatus are conveniently performed.

SUMMARY OF THE INVENTION

It is an object of the present invention to provide an improved cassette type recording and/or reproducing apparatus.

It is yet another overall object of this invention to provide a cassette-type recording apparatus having a recessed chassis and an arrangement of components which facilitates assembly primarily from a direction above the chassis.

It is another object of the present invention to provide a cassette type recording and/or reproducing apparatus having a remarkably thin profile construction.

It is still another object of this invention to provide a recessed chassis for a cassette-type recording apparatus to contain the reel beds and the mode-changing apparatus in the recess.

The above-described objects can be achieved by providing a cassette type recording apparatus, comprising: (a) chassis means capable of mounting a cassette on an upper surface thereof; (b) a pair of reel means mounted within a recess on the upper surface of the chassis means; and (c) actuation change means mounted within the recess for actuating the reel means.

The actuation change means comprises drive means for respectively actuating selected ones of the reel means to operate the cassette in various modes.

BRIEF DESCRIPTION OF THE DRAWINGS

A more complete understanding of the present invention may be obtained from the following description taken in conjunction with the attached drawings in which.

DETAILED DESCRIPTION OF THE PREFERRED EMBODIMENTS

Reference will hereinafter be made to the drawings in order to facilitate an understanding of the present invention.

FIGS. 1 through 5 show a cassette tape recorder as a cassette-type recording and/or reproducing apparatus to which the present invention is applicable. The cassette tape recorder is an automatically-reversing type of a dual capstan system using a compact cassette.

Figure 1:
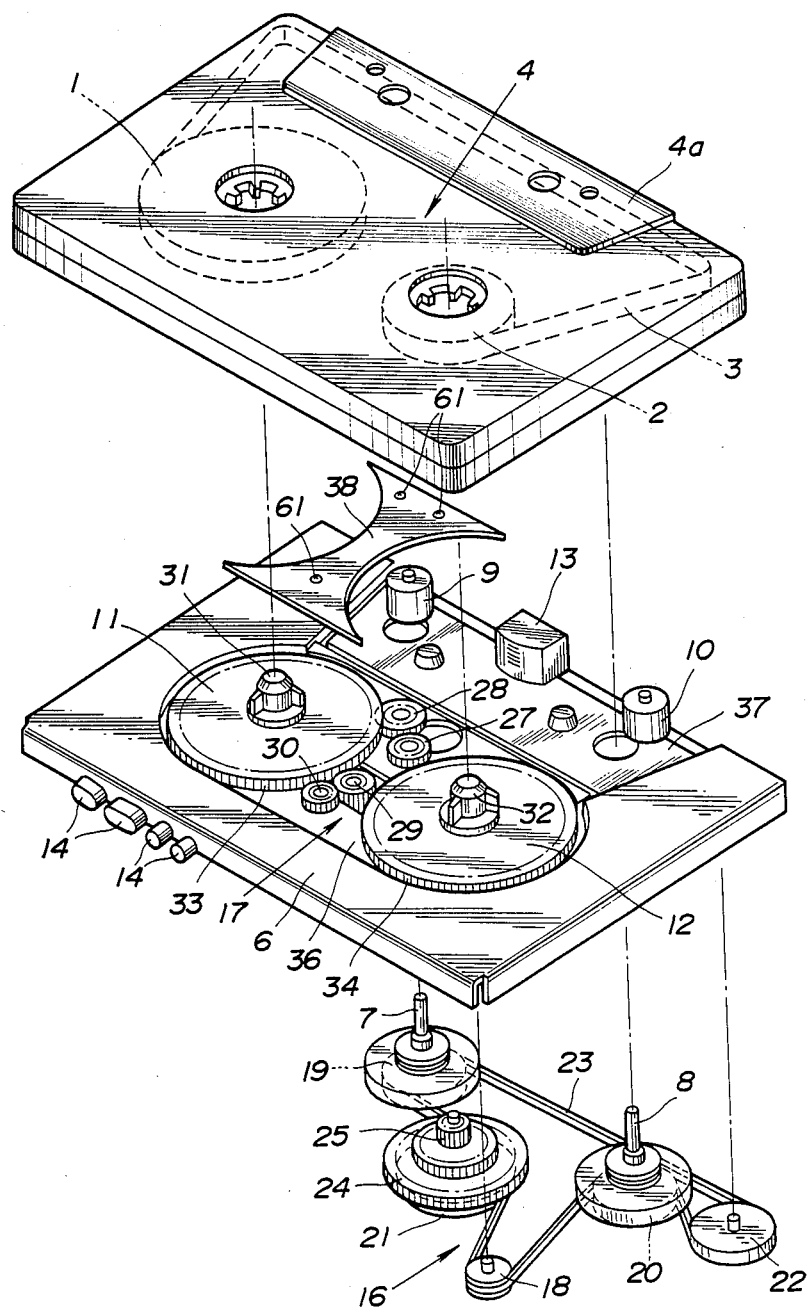
FIG. 1 is an overall exploded perspective view of a preferred embodiment of a cassette type recording and/or reproducing apparatus according to the present invention.

As shown in FIG. 1, a magnetic tape 3 wound on a pair of reel hubs 1, 2 is housed in a cassette, designated generally by the reference numeral 4. The cassette 4 is horizontally mounted for recording and playback on an upper part of a chassis 6 cooperating with recording and reproducing components (not shown) as a part of an overall apparatus. The chassis 6 is structurally adapted to cooperate with a drive mechanism for rotating the reel hubs for the respective tape reels in the cassette in a forward or in a reverse direction, at various speeds, to record and play back information on the tape 3.

The upper part or top surface of the chassis 6 contains a pair of left and right capstans 7, 8, pinch rollers 9, 10, reel beds 11, 12, and a magnetic head 13. The pair of left and right reel hubs 1, 2 are respectively engaged with the corresponding reel beds 11, 12. The magnetic tape 3 is extended through the capstans 7, 8 and the magnetic head 13. A plurality of operating buttons 14 for a play back or record mode, a fast forward mode, a rewind mode, a stop mode, and so on are attached to a side surface of the chassis 6 to control the mode of operation of the cassette 4.

An actuation device 16 for actuating the pair of capstans 7, 8 to rotate in mutually reverse directions and for selectively actuating the pair of reel beds 11, 12 is installed on a lower part or bottom surface of the chassis 6. A change in the direction of rotation of the pair of reel beds 11, 12 is accomplished by a gear change mechanism 17 installed at an intermediate space between the reel beds 11, 12 and on the upper part of the chassis 6. The gear change mechanism 17 comprises a plurality of gears 27, 28, 29, and 30.

When the playback button, included among the buttons 14, is depressed with the cassette 4 mounted on the chassis 6, the pinch roller 9 is pressed into contact with the capstan 7 and the left reel bed 11 is actuated to rotate in a counterclockwise direction. With the magnetic tape 3 running normally to wind on the left reel hub 1, a normal playback, or normal recording is caused on the tape 3 by the magnetic head 13. When the end of the tape 3 is reached during the normal run, the pinch roller 9 is separated from the capstan 7. After actuation of the reel bed 11 has ceased, the other pinch roller 10 is pressed into contact with the other capstan 8. At this time, the right reel bed 12 is actuated to rotate in a clockwise direction and the magnetic tape 3 runs in a reverse direction to wind on the other or right reel hub 2. Consequently, a reverse playback or a reverse recording is caused on the tape 3 by the magnetic head 13. When a fast forward or a rewind button among the operation buttons 14 is depressed, a fast forward or rewind of the magnetic tape 3 is caused with the reel beds 11, 12 selectively actuated to rotate at a high speed, i.e. at a speed higher than used for normal or reverse recording or playback.

The rotation actuation device 16, as shown in FIG. 1, comprises a drive pulley 18 actuated by means of a motor, to be described later, a pair of capstan pulleys 19, 20 attached to a lower end of the capstans 7, 8, and a belt 23 wound about an intermediate pulley 21 and a direction change pulley 22. A Fast Forward and Rewind (FR) drive gear 24 is integrally and coaxially mounted on an upper part of the intermediate pulley 21. Furthermore, a Normal and Reverse (NR) drive gear 25 actuated via a torque limiter (not shown) is also coaxially mounted on an upper portion of the FR drive gear 24. The gear change mechanism 17 is provided with the Normal and Reverse (NR) gears 27, 28 and Fast Forward and Rewind (FR) gears 29, 30. A pair of reel axles 31, 32 are respectively installed on the upper portions of centers of the reel beds 11, 12, respectively. A pair of reel bed gears 33, 34 are respectively installed on the peripheries of the reel beds 11, 12.

The structure of the chassis 6 and the mounting states of the reel beds 11, 12 and gears 27 through 30 will be described with reference to FIG. 2 through FIG. 5.

Figure 2:
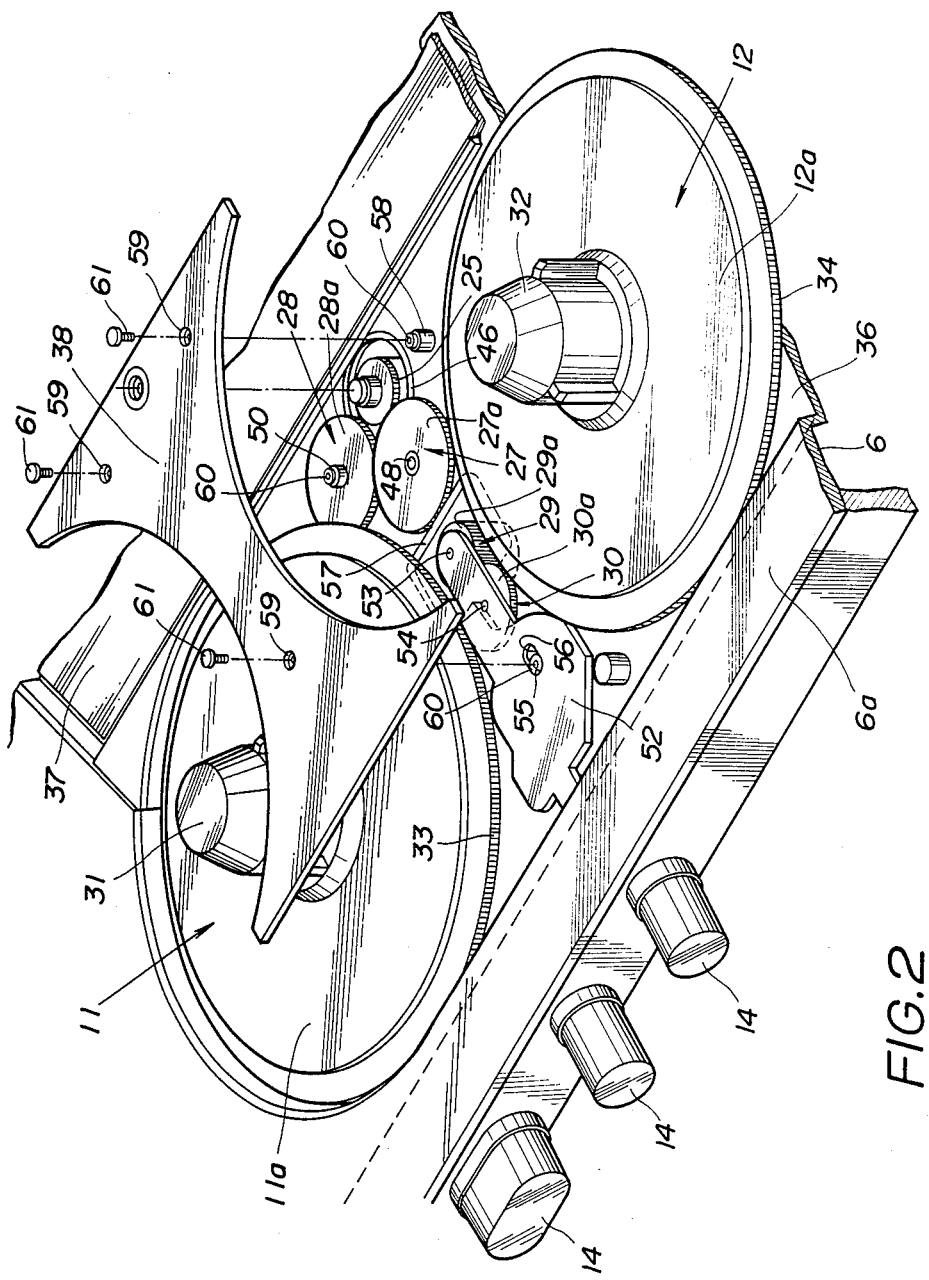
FIG. 2 is an exploded perspective view of an essential part of the cassette-type recording and/or reproducing apparatus shown in FIG. 1.
Figure 3:
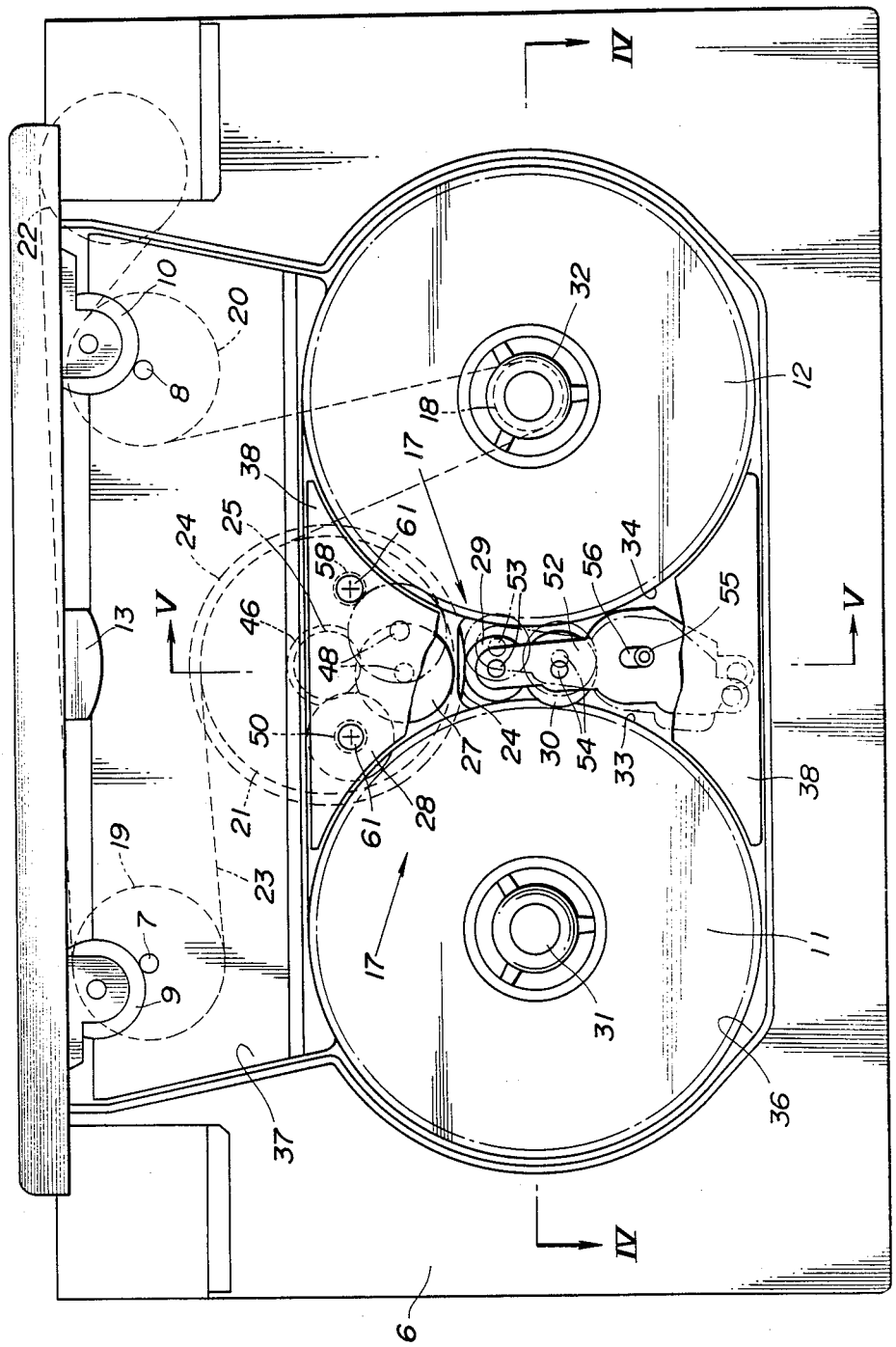
FIG. 3 is a top plan view of the essential part of the cassette-type recording and/or reproducing apparatus shown in FIGS. 1 and 2.

A shown in FIG. 2, the chassis 6 is made of a metallic plate. An upper surface 6a of the chassis 6 has a recess 36 substantially in the form of an ellipse (as best seen in FIG. 3) at substantially a center portion of the upper surface 6d and another recess 37 substantially in the form of a trapezoid at a rear portion of the upper surface 6a with respect to the side surface on which the plurality of operating buttons 14 are mounted. These recesses are formed by a pressing or drawing process. It should be noted that the recesses 36, 37 act to reinforce the chassis 6 so that the chassis 6 becomes extremely rigid through the pressing of the recesses 36, 37.

Figure 4:
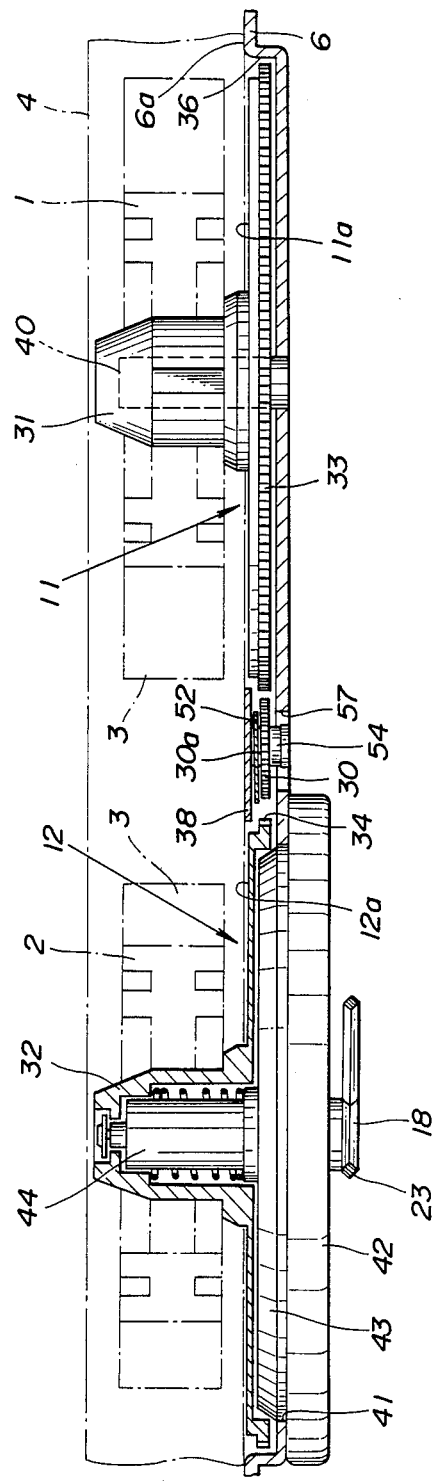
FIG. 4 is a sectional view of the cassette-type recording and/or reproducing apparatus taken along line IV—IV in FIG. 3.
Figure 5:
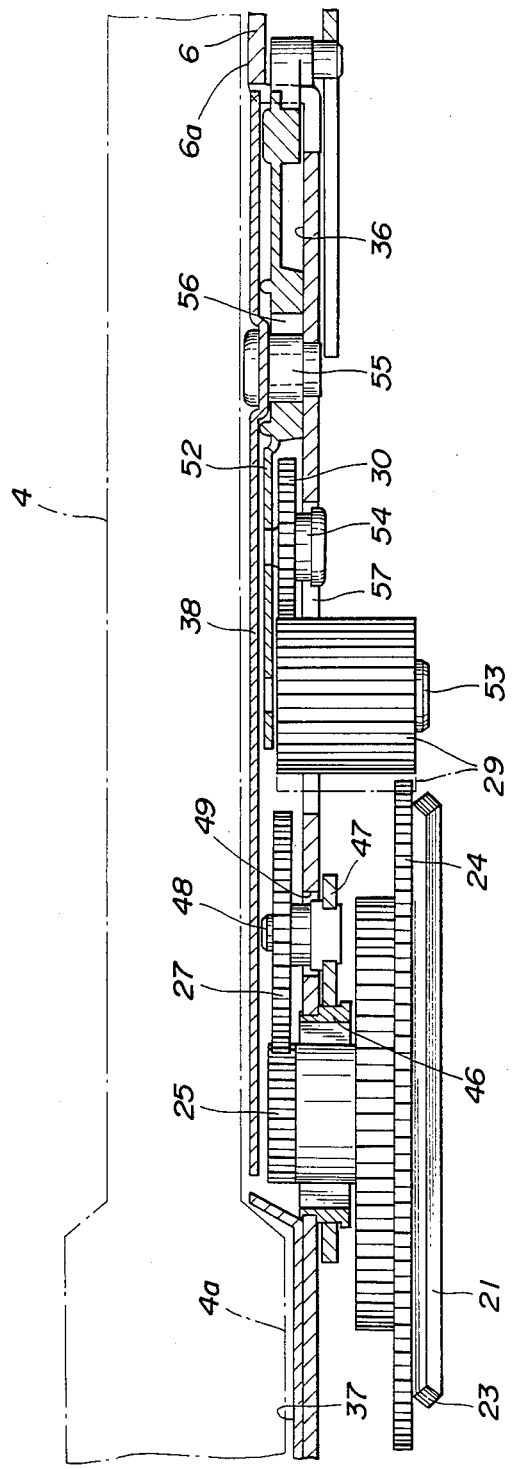
FIG. 5 is a sectional view of the cassette-type recording and/or reproducing apparatus taken along line V—V in FIG. 3.

The reel beds 11, 12 and gears 27 through 30 are mounted on the upper portion of the chassis 6 and within the recess 36 so as to be positioned on left and right sides and at a center position within the recess 36. The upper surfaces 11a, 12a of the reel beds 11, 12 and the upper surfaces 27a through 30a of the gears 27 through 30 are located at substantially the same level as, or lower than, the upper surface 6a of the chassis 6, as can be seen in FIGS. 2, 4, and 5. In addition, a cover plate 38 (as best seen in FIGS. 1, 2, and 3), substantially in a double concave shape, is screwed substantially on the same plane as the upper surface 6a of the chassis 6 at an upper portion of a center portion of the recess 36, as seen in FIG. 5. The cover plate 38 is used to cover the above-described gears 27 through 30. The pair of capstans 7, 8 is mounted within the rearward, generally-trapezoidal recess 37.

As shown in FIG. 4, the reel bed 11 is rotatably mounted on an outer periphery of a supporting pole 40 which is installed on the upper portion of the recess 36 in the chassis 6. At this time, the reel bed 11 is inserted into the recess 36 with its center opening penetrated by the supporting pole 40.

The other reel bed 12 is rotatably mounted on an outer periphery of a supporting pole 44 which is installed on the upper portion of a casing 43 of the motor 42 attached from a lower side of the chassis at an opening 41 installed in the recess of the chassis 6. At this time, the other reel bed 12 is inserted into the recess 36 with its center hole penetrated by the supporting pole 44. A suitable structure for the motor 42 is exemplified in the U.S. Pat. No. 4,630,149 by the same applicants.

As shown in FIGS. 3 and 5, a supporting lever 47 is mounted on a supporting pole 46 mounted coaxially on an outer periphery of the NR drive gear 25 placed below the chassis 6 so as to enable the lever 47 to swing on the supporting pole 46. A supporting pin 48 installed on an upper portion of a tip of the supporting lever 47 projects toward an upper portion of the recess 36 from the opening 49 of the recess 36 of the chassis 6. The NR gear 27 is rotatably supported on the outer periphery of the supporting pin 48. At this time, the one NR gear 27 is inserted into the recess 36 from the upper direction of the chassis 6 during assembly. The other NR gear 28 is rotatably supported on the outer periphery of the supporting pin 50 fixed on the upper portion of the recess 36 of the chassis 6, as seen in FIGS. 2 and 3. At this time, the other NR gear 28 is inserted onto the supporting pin 50 thereinto from the upper part of the chassis 6. The other NR gear 28 is always engaged with the reel bed gear 33 of the one reel bed 11. The one NR gear 27 can be engaged with or disengaged from the other NR gear 28 and reel bed gear 34 of the other reel bed 12, while the one NR gear 27 is always engaged with the NR drive gear 25.

In addition, the FR gears 29, 30 are rotatably mounted on mounting pins 53, 54 mounted on the lower part of a tip of a supporting lever 52 arranged within the recess 36 of the chassis 6. The supporting lever 52 is inserted onto a supporting pin 55 fixed on the upper part of the recess 36 of the chassis 6 via an elongated hole 56 during the assembly, is free to swing around the supporting pin 55 and is movable in the elongated direction of the elongated hole 56. The FR gear 29 comprises a wide gear projected from the opening 57 of the recess 36 of the chassis 6 toward a lower direction of the recess 36 and is detachably engaged with the reel bed gear 34 of the reel bed 12 and the FR drive gear 24. In addition, the other FR gear 30 is always meshed with the FR gear 29 so as to engage detachably with the reel bed gear 33 of the one reel bed 11.

As shown in FIGS. 2, 3 and 5, the cover plate 38 has three holes 59 each located substantially at a vertex of an isoceles triangle formed by the cover plate 38. On the other hand, on the upper part of the recess 36, two supporting pins 50, 55 extend vertically from the NR gear 28 and the elongated hole 56, respectively, while another supporting pin 58 extends vertically from the upper surface of the recess 36. In addition, three female threaded holes 60 are provided on upper central portions of the three supporting pins 50, 55, 58, respectively. When the screws 61 are fitted into the corresponding female threaded holes 60 via the corresponding holes 59 in the cover plate 38, the cover plate 38 is positioned horizontally with respect to the recess 36 and detachably screwed to the chassis 6.

As shown in FIGS. 4 and 5, the cassette 4 denoted by a dot-and-dash line is mounted horizontally on the chassis 6. When the reel hubs 1, 2 are engaged with the reel axles 31, 32 of the reel beds 11, 12 and the magnetic tape 3 is set so as to pass about the capstans 7, 8 and in contact with the magnetic head 13, the cassette 4 can be brought in close contact with the upper surface 6a of the chassis 6. Consequently, the entire tape recorder can be remarkably compacted especially for its height. At this time, as shown in FIG. 5, an extended portion 4a, which is trapezoidally-shaped and located at the rear surface of the cassette, is fitted to the recess 37 of the chassis 6.

Since, in the above-described construction, the reel beds 11, 12 and the plurality of gears 27 through 30 can be assembled on the upper portion of the chassis 6 within the recess 36 from a single direction, i.e. from above the upper part of the chassis 6, the reel beds 11, 2 and gears 27 through 30 can be assembled extremely simply. In addition, since a single cover plate 38 can serve to prevent the NR gears 27, 28 inserted from the upper direction and attached to the supporting pins 48, 50 from drawing out toward the upper direction as well as to prevent the FR gears 29, 30 inserted from the upper direction and attached to the supporting pin 55 via the supporting lever 52 from drawing out toward the upper direction, it is not necessary to attach washers for preventing the gears from drawing out toward the upper direction to the individual upper ends of the supporting pins 48, 50, 55. Hence, the number of parts to be used for assembly and the labor time required therefor can be reduced remarkably. In addition, a mere removal of the single cover plate 38 screwed to the upper surface of the chassis can facilitate the replacement of the gears 27 through 30 and achieve better service.

The change of rotation in the direction of the reel beds 11, 12 by means of the gear change mechanism 17 will be described below with reference to FIG. 3.

When the magnetic tape 3 is in the normal playback or record mode, the NR gear 27 is meshed with the NR gear 28 as denoted by a solid line and the NR drive gear 25 actuates the reel bed 11 to rotate in a counterclockwise direction as viewed from FIG. 3 via the NR gears 27, 28 and the reel bed gear 33. On the other hand, when the magnetic tape 3 is in a reverse playback or record mode, the NR gear 27 is meshed with the reel bed gear 34 as denoted by a dot-and-dash line and the NR drive gear 25 actuates the other reel bed 12 to rotate in a clockwise direction via the NR gear 27 and the reel bed gear 34. When the magnetic tape 3 is in the fast forward mode, the FR gears 29, 30 are respectively meshed with the FR drive gear 24 and reel bed gear 33 as denoted by solid lines, and the FR drive gear 24 actuates the one reel bed 11 to rotate in the counterclockwise direction via these gears 29, 30, 33 at a high speed. When the magnetic tape 3 is in the rewind mode, the FR gear 29 is meshed with the FR drive gear 24 and the reel bed gear 34 as denoted by the dot-and-dash line, so as to actuate the other reel bed 12 to rotate at a high speed via these gears 29, 34.

Since according to the present invention recesses are formed on the upper surface of the chassis and the pair of left and right reel beds and associated gears to actuate these reel beds are attached on the upper surface of the one recess in a direction from above the chassis, the cassette can be mounted on the upper surface of the chassis with the entire surface of the cassette brought in close contact with the upper surface of the chassis. Consequently, the entire cassette tape recorder of cassette-type recording and/or reproducing apparatus can remarkably be compacted. In addition, since the reel beds and gears can be assembled only on the upper side of the chassis from a direction from above the chassis, the assembly of the reel beds and gears can be carried out in a very simple manner as compared with the conventional structure in which the reel beds and gears are assembled separately on the upper and lower surfaces of the chassis. Therefore, an easy assembly operation can be achieved. The recesses formed on the upper surface of the chassis also provide a reinforcement structure for the chassis. Therefore, the chassis becomes very rigid.

As described in the above embodiment, the single cover plate 38 serves to prevent draw out of the plurality of gears 27 through 30 so that the number of parts to be used for the assembly of the cassette type recording and/or reproducing apparatus and labor time required to assembly can remarkably be achieved.

The present invention is applicable to the other types of cassette type recording and/or reproducing apparata such as cassette-type Video Tape Recorders (VTR's) as well as to the cassette tape recorder.

It will clearly be appreciated by those skilled in the art that the foregoing description is made in terms of the preferred embodiment and various changes and modifications can be made without departing from the scope of the present invention which is to be defined by the appended claims.

What is claimed is:

1. A cassette type recording and/or reproducing apparatus, comprising:
   (a) chassis means capable of mounting a cassette on an upper surface thereof and defining a recess on the upper surface thereof, a portion of the upper surface being within said recess and a portion of the upper surface being outside said recess;
   (b) a pair of reel beds rotatably mounted within said recess and above the portion of the upper surface within said recess, at least a portion of said reel beds being below the level of the portion of the upper surface outside said recess; and
   (c) actuation means for selectively rotating said reel beds, said actuation means being mounted within said recess and above the portion of the upper surface within said recess.

2. The cassette type recording and/or reproducing apparatus according to claim 1, wherein said actuation means comprises: (a) first drive means installed at an intermediate position between said reel beds for actuating one of said reel beds to rotate in a recording mode; and (b) second drive means installed at an intermediate position between said reel beds for actuating one of said reel beds to rotate in a fast forward mode.

3. The cassette type recording and/or reproducing apparatus according to claim 2, wherein each of said reel beds includes a reel gear on an outer periphery thereof and wherein said first drive means includes a first gear means meshed with the reel gear of one of said reel beds and said second drive means includes a second gear means meshed with the reel gear of one of said reel beds.

4. The cassette type recording and/or reproducing apparatus according to claim 3, which further comprises means for driving said rotation actuation means including first and second drive gears coaxially mounted on each other, said driving means being capable of meshing with said first and second gear means.

5. The cassette type recording and/or reproducing apparatus according to claim 1, which further comprises a cover plate secured across said recess, over said actuation means and between said reel beds.

6. The cassette type recording and/or reproducing apparatus according to claim 1, further comprising means for retaining said actuation means in said recess, said retaining means comprising a cover plate engaging said actuation means.

7. A cassette type recording and/or reproducing apparatus, comprising:
(a) chassis means structurally adapted to be capable of mounting a cassette on an upper surface thereof, said chassis means including a plate defining a recess in an upper surface thereof, said upper surface including a first portion in said recess at a first level and a second portion outside said recess at a second level spaced from said first level;
(b) a pair of reel beds rotatably mounted within said recess on the upper surface of said plate and above said first level; and
(c) actuation means for selectively rotating said reel beds, said actuation means being mounted within said recess for rotating said reel beds, said reel beds and said actuation means defining upper surfaces, said upper surfaces being positioned at a level at least as close to said first level as said second level is.

8. The cassette type recording and/or reproducing apparatus according to claim 7, wherein said actuation means comprises: (a) first drive means installed at an intermediate position between said reel beds for driving said actuation means to rotate one of said reel beds in a recording mode and in a reproducing mode; and (b) second drive means installed at an intermediate position between said reel beds for driving said actuation means to rotate one of said reel beds in a fast forward mode and in a rewind mode.

9. The cassette type recording and/or reproducing apparatus according to claim 8, wherein each of said reel beds includes a reel gear on an outer periphery thereof and wherein said first drive means includes a first gear means meshed with one reel gear of said reel beds and said second drive means includes a second gear means meshed with one reel gear of said reel beds.

10. The cassette type recording and/or reproducing apparatus according to claim 9, which further comprises rotation actuation means including first and second drive gears coaxially mounted on each other and which are capable of meshing with said first and second gear means.

11. The cassette type recording and/or reproducing apparatus according to claim 7, which further comprises a cover plate secured across said recess over said actuation means and between said reel beds.

12. A cassette type recording and/or reproducing apparatus, comprising:
(a) a chassis comprising a plate capable of mounting a cassette recording medium on an upper surface thereof;
(b) first means formed in the plate for reinforcing the plate;
(c) a pair of reel beds mounted on said first means for mating with a pair of reel hubs on the cassette recording medium; and
(d) a gear mechanism mounted on said first means together with said pair of reel beds for rotating either of the pair of reel beds according to a selected operation mode.

13. The apparatus according to claim 12, wherein said first means is a recess formed in a substantially intermediate part of the plate.

14. The apparatus according to claim 13, wherein the recess includes a first portion substantially shaped as an ellipse.

15. The apparatus according to claim 13, wherein said recess further includes a portion on which a magnetic head and pinch rollers are mounted.

16. The apparatus as set forth in claim 12, wherein said first means is a recess defined about at the center portion of the upper surface of said plate, the upper surface of said plate being at a first level within the recess and at a second level, spaced from said first level, outside the recess, said reel beds and said gear mechanism being mounted within said recess and having upper surfaces located at a level at least as close to said first level as said second level is.

* * * * *